(12) United States Patent
Macris

(10) Patent No.: US 6,554,232 B1
(45) Date of Patent: Apr. 29, 2003

(54) TUBE CLIP

(75) Inventor: Harold F. Macris, Fort Wayne, IN (US)

(73) Assignee: International Truck Intellectual Property Company, L.L.C., Warrenville, IL (US)

( * ) Notice: Subject to any disclaimer, the term of this patent is extended or adjusted under 35 U.S.C. 154(b) by 0 days.

(21) Appl. No.: 09/705,560

(22) Filed: Nov. 2, 2000

Related U.S. Application Data (60) Provisional application No. 60/163,648, filed on Nov. 4, 1999.

(51) Int. Cl.[7] .................. F16B 15/00; F16B 45/00; F16L 3/00; F16L 3/08
(52) U.S. Cl. .................. 248/71; 248/65; 248/73; 248/74.2
(58) Field of Search .................. 248/74.3, 65, 71, 248/74.1, 74.2, 73; 24/543

(56) References Cited

U.S. PATENT DOCUMENTS

| | | | | |
|---|---|---|---|---|
| 3,421,187 A | * | 1/1969 | Ryder | 24/81 |
| 3,944,177 A | * | 3/1976 | Yoda | 248/74 |
| 4,131,258 A | * | 12/1978 | Okuda | 248/73 |
| 4,195,807 A | * | 4/1980 | Llauge | 248/74 |
| 4,295,618 A | * | 10/1981 | Morota | 248/73 |
| 4,470,179 A | * | 9/1984 | Gollin | 24/453 |
| 4,840,334 A | * | 6/1989 | Kikuchi | 248/73 |
| 5,020,749 A | * | 6/1991 | Kraus | 248/74.3 |
| 5,039,040 A | * | 8/1991 | Idjakiren | 248/73 |
| 5,704,573 A | * | 1/1998 | de Beers | 248/73 |
| 5,906,342 A | * | 5/1999 | Kraus | 248/74.1 |

FOREIGN PATENT DOCUMENTS

| | | | | |
|---|---|---|---|---|
| DE | 2066887 A | * | 11/1979 | 248/74.3 |
| ES | 2040348 A | * | 1/1979 | 348/74.3 |

* cited by examiner

*Primary Examiner*—Anita King
*Assistant Examiner*—Amy J. Sterling
(74) *Attorney, Agent, or Firm*—Jeffrey P. Calfa; Neil T. Powell; Dennis Kelly Sullivan

(57) ABSTRACT

The invention is a tube clip with a clip end and a cam. The design of the tube clip allows the rotation of the tube clip after insertion into a mounting support. Preferably the installed tube clip can rotate no farther than about a quarter turn or about 90° after insertion. The clip end has a base, first and second sides and a channel. The first and second sides are at opposite ends of the base and perpendicular thereto with the channel inbetween. A slanted guide extends inwardly along the length of the first side distal to the base. A slanted outer face extends inwardly along the length of the second side distal to the base. The slanted guide and the outer face align to cooperatively guide a tube into the channel. The cam has a head and a stem connecting the head to the base. The head has a beveled edge and a shoulder. The shoulder projects from the beveled edge toward the stem and overhangs the base.

21 Claims, 6 Drawing Sheets

TUBE CLIP

This is a non-provisional application claiming priority of provisional application Serial No. 60/163,648, filed Nov. 4, 1999.

BACKGROUND OF THE INVENTION

1. Field of the Invention

The present invention relates to a tube clip for tubing.

2. Description of the Prior Art

Brake, HVAC, and other types of hydraulic tubing are installed using tube clips, especially in motor vehicles. A long piece of hydraulic tubing is secured by tube clips at a number of discrete points. Each of these points reduces the vibrations to the tubing from its ends. This vibration can otherwise lead to damage to the tubing, either by fatigue failure of the tubing, or by causing the tubing to bump against nearby components, which can eventually wear through the tubing. Thus, if a tube clip is misinstalled or broken and consequently falls out of its mounting bracket or surface, the tubing is at risk due to unconstrained vibration in the area of the bracket. This unconstrained vibration allows the tubing to repeatedly bump against the bracket itself and lead to tubing failure. Because the tubing is used with hydraulic lines, especially brake lines, this can cause the loss of hydraulic fluid and lead to dangerous failure.

Many types of tube clips, such as those with "rabbit ears" retaining flanges, have been used in the prior art to hold such tubing. Prior art rabbit ear flanges do not have a positive locking shank. These tube clips, for example, typical insert into a bracket or other mounting surface by using resilient arrowhead-shaped shanks or cross tree designs. The resilient shanks have a number of disadvantages. The tube clips with cross tree shanks, for example, can be accidentally left only partially inserted into a slot during assembly. Therefore, Therefore, they can loosen or work their way out of the slot in which they are inserted after final assembly. In addition, cross tree shanks have a number of small resilient legs which are thin and can easily break, both during and after assembly with the tubing.

To make sure the prior art tube clips are properly installed when assembling the tubing, the assembly worker must check for loose or missing tube clips, and either tighten the loose tube clips or reinstall the missing ones. All of which could take additional time during assembly and requires additional parts being stored down the line.

Therefore, one object of the invention is to design a tube clip that provides production line reliability. The tube clip should provide a high degree of certainty of being properly mounted and staying properly mounted. A second objective is to design a tube clip with a shank or cam with few parts for strength and durability. Another object of the invention is to design a tube clip that is easy to insert into and remove from a bracket. Still, another object of the invention is to reduce the possibility of failure of the tubing due to vibrational stress.

SUMMARY OF THE INVENTION

According to the invention there is provided a tube clip with a clip end and a cam. The clip end has a base, first and second sides and a channel. The first and second sides are at opposite ends of the base and perpendicular thereto with the channel in between. A slanted guide extends inwardly along the length of the first side distal to the base. A slanted outer face extends inwardly along the length of the second side distal of the base. The slanted guide and the outer face align to cooperatively guide a tube into the channel.

The cam has a head and a stem connecting the head to the base. The head has a beveled edge and a shoulder. The shoulder projects from the beveled edge toward the stem and overhangs the base.

The design of the tube clip allows the rotation of the tube clip after insertion into a mounting support. Preferably the installed tube clip can rotate no farther than about a quarter turn or about 90° after insertion. Additional effects, features and advantages will be apparent in the written description that follows.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE INVENTION

Figure 3:
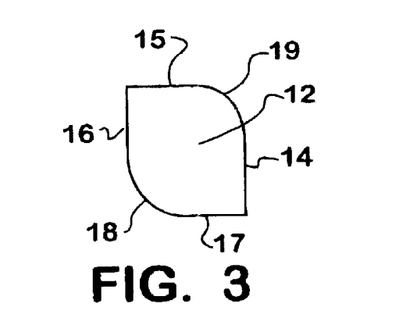
FIG. 3 is a cross-sectional view of the stem of the invention along axis a–a'.
Figure 4:
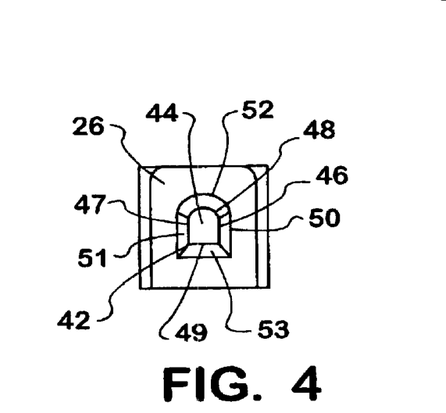
FIG. 4 is a bottom plan view of one of the tube clips of the invention.
Figure 5:
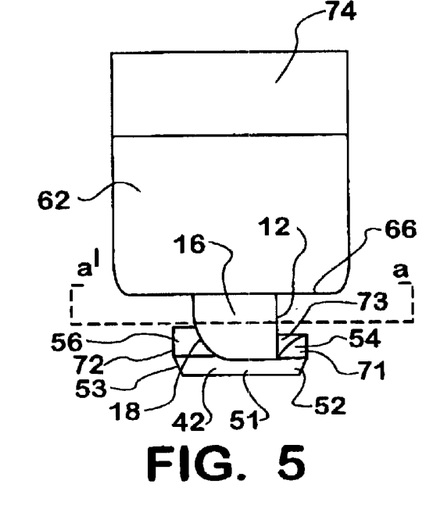
FIG. 5 is a view of one of the tube clips of the invention.

Turning to the Figures where like reference numerals refer to like features, tube clip 10 has cam 13 connected to clip end 20. Cam 13 has stem 12 and head 42. In the cross-section illustrated by FIG. 3, stem 12 is preferably quadrilateral and is formed from two pairs of parallel lines 14, 15, 16, 17 and opposed vertices 18, 19 removed by rounding. More preferably, stem 12 has short 15, 17 and long 14, 16 rectangular sections with a single pair of opposed rounded vertices 18, 19.

Figure 6:
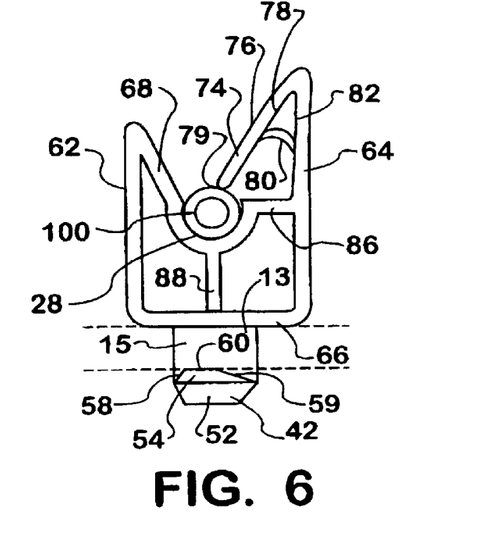
FIG. 6 is a front view of one of the tube clips of the invention illustrated by FIG. 5 rotated 90°.
Figure 7:
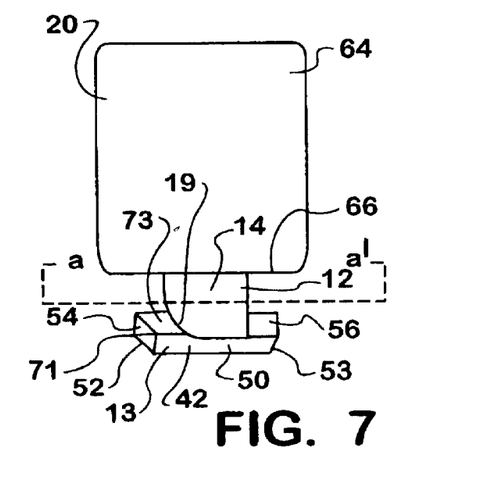
FIG. 7 is a side view of one of the tube clips of the invention illustrated by FIG. 5 rotated 180°.
Figure 8:
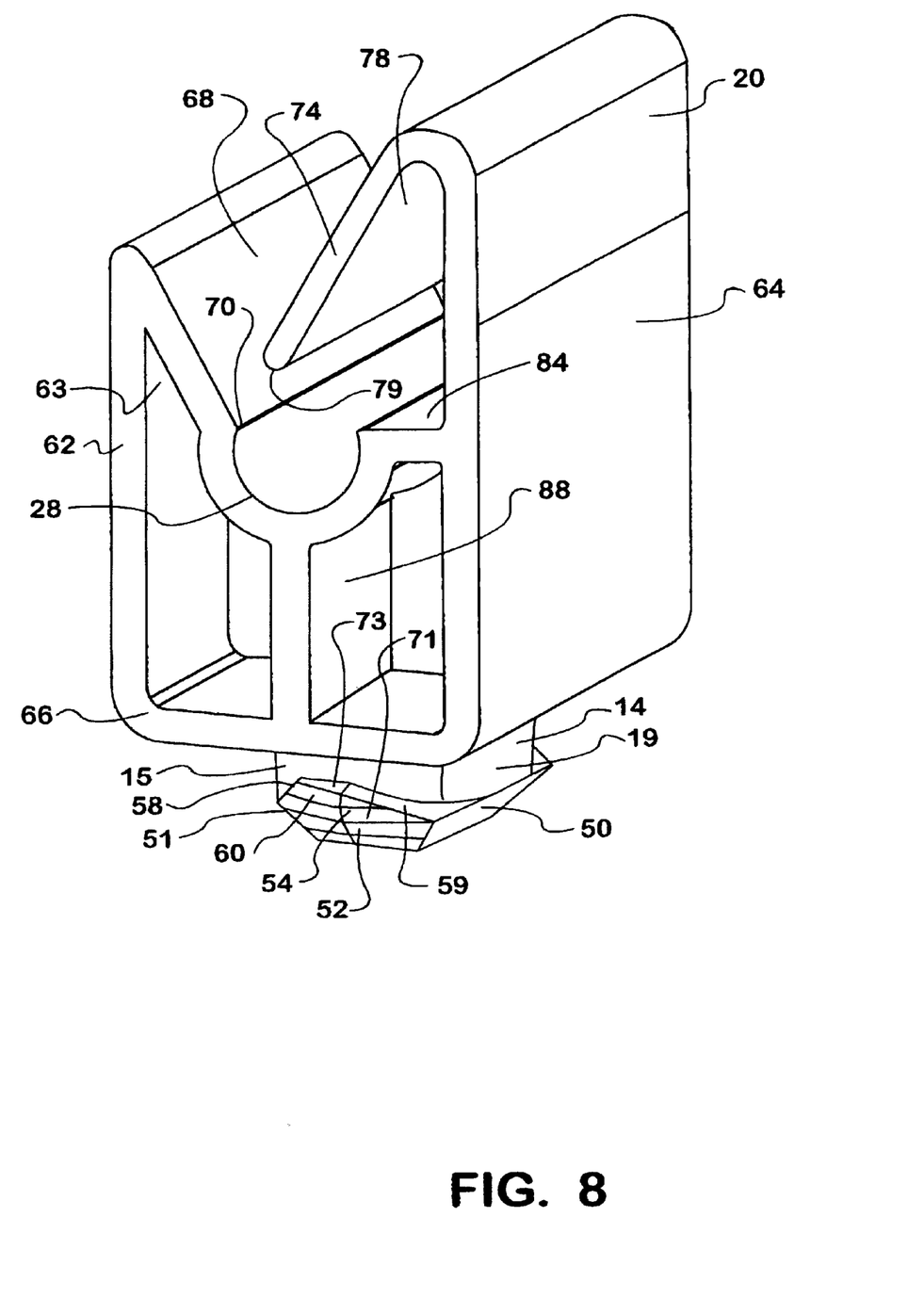
FIG. 8 is a perspective view from the side of one of the tube clips of the invention.
Figure 9:
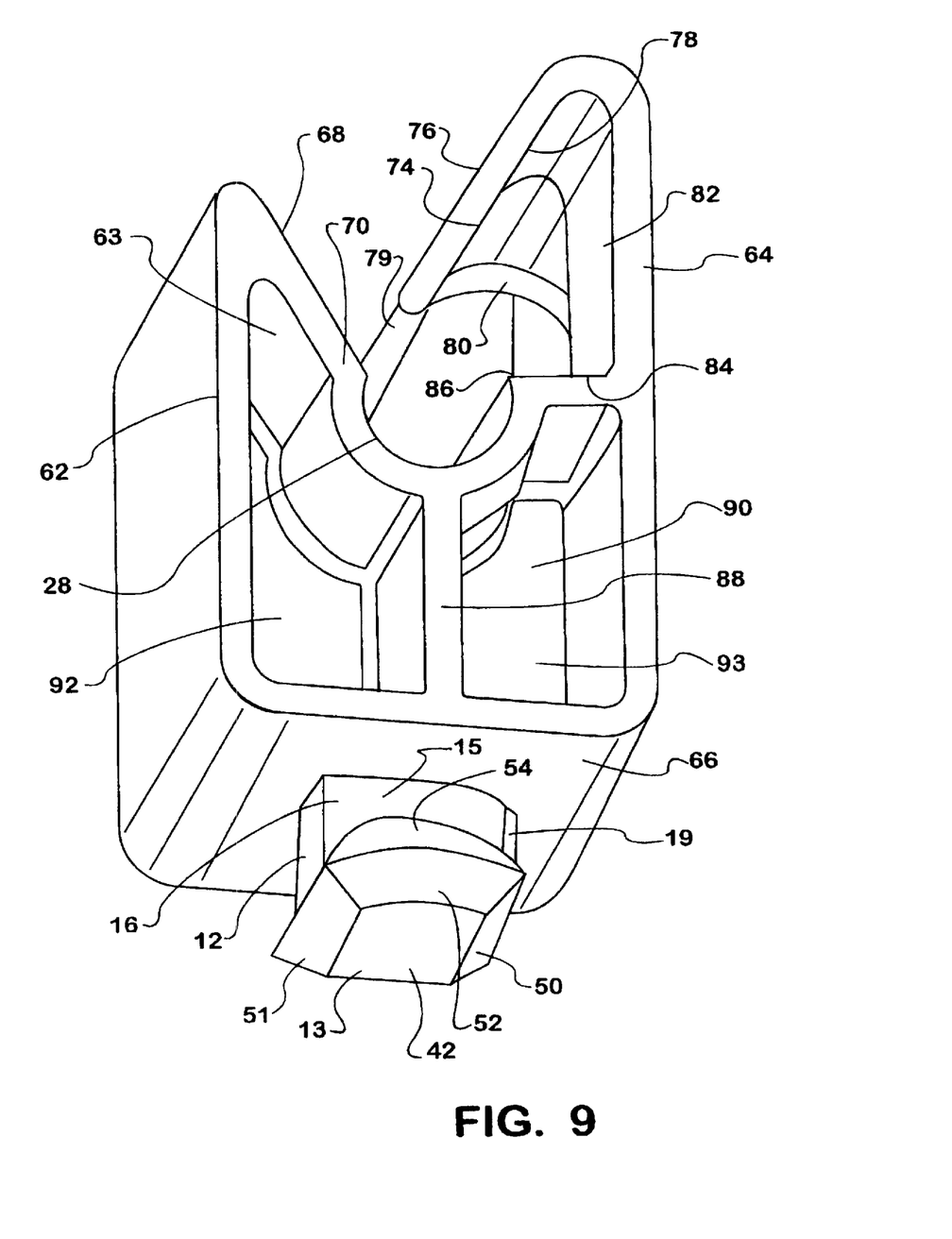
FIG. 9 is a perspective view from below of one of the tube clips of the invention.

Head 42 has flat surface 44 bordered by beveled edges 50, 51, 52, 53 and is longer than stem 12. Head 42 can be quadrilateral with parallel long head portions 46, 47 and parallel short head portion 48, with one short head portion 48 preferably being curved. Two shoulders 54, 56 project from beveled edges 52, 53 toward stem 12 and overhang base 26, 66. Shoulders 54, 56 are preferably located at the short sections 15, 17 of stem 12 and are preferably angled and/or curved. Shoulders 54, 56 can have three segments, with first 58 and second 59 segments angled at the vertices of stem 12 and third segment 60 between first 58 and second 59 segments which can be substantially parallel to base 26, 66 (FIG. 6). Second segment 59 can be longer with a smaller angle at the vertex of stem 12 than first segment 58. Outside shoulders 71, 72 can be curved or flat. For example, first shoulder 54 located at beveled edge 52 of curved short head portion 48 can have a curved outside shoulder 71, while outside shoulder 72 of second shoulder 56 can be flat. If desired, the shoulders can differ in the size of overhang. For example, the distance between beveled edge 52 to third segment 60 of shoulder 54 (FIG. 6) can be less than the distance from beveled edge 53 to a third segment of second shoulder 56 opposite short head portion (not shown). The base facing surface 73 of the shoulders is typically flat. The distance between the base of the tube clip and the shoulders should be slightly less than or approximately equal to the thickness of the mounting support to ensure a tight fit after installation.

Figure 1:
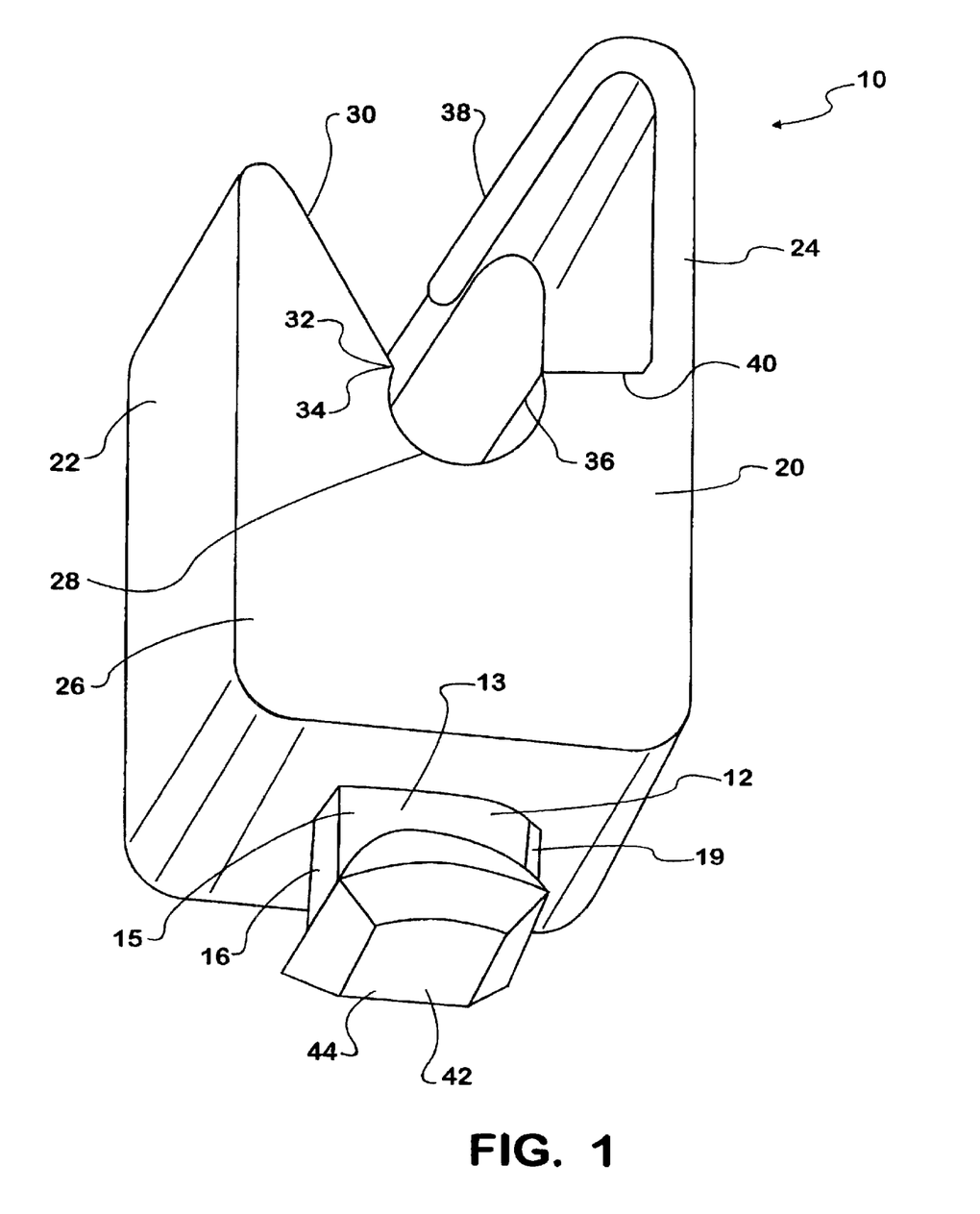
FIG. 1 is a perspective view from below of one of the tube clips of the invention.
Figure 2:
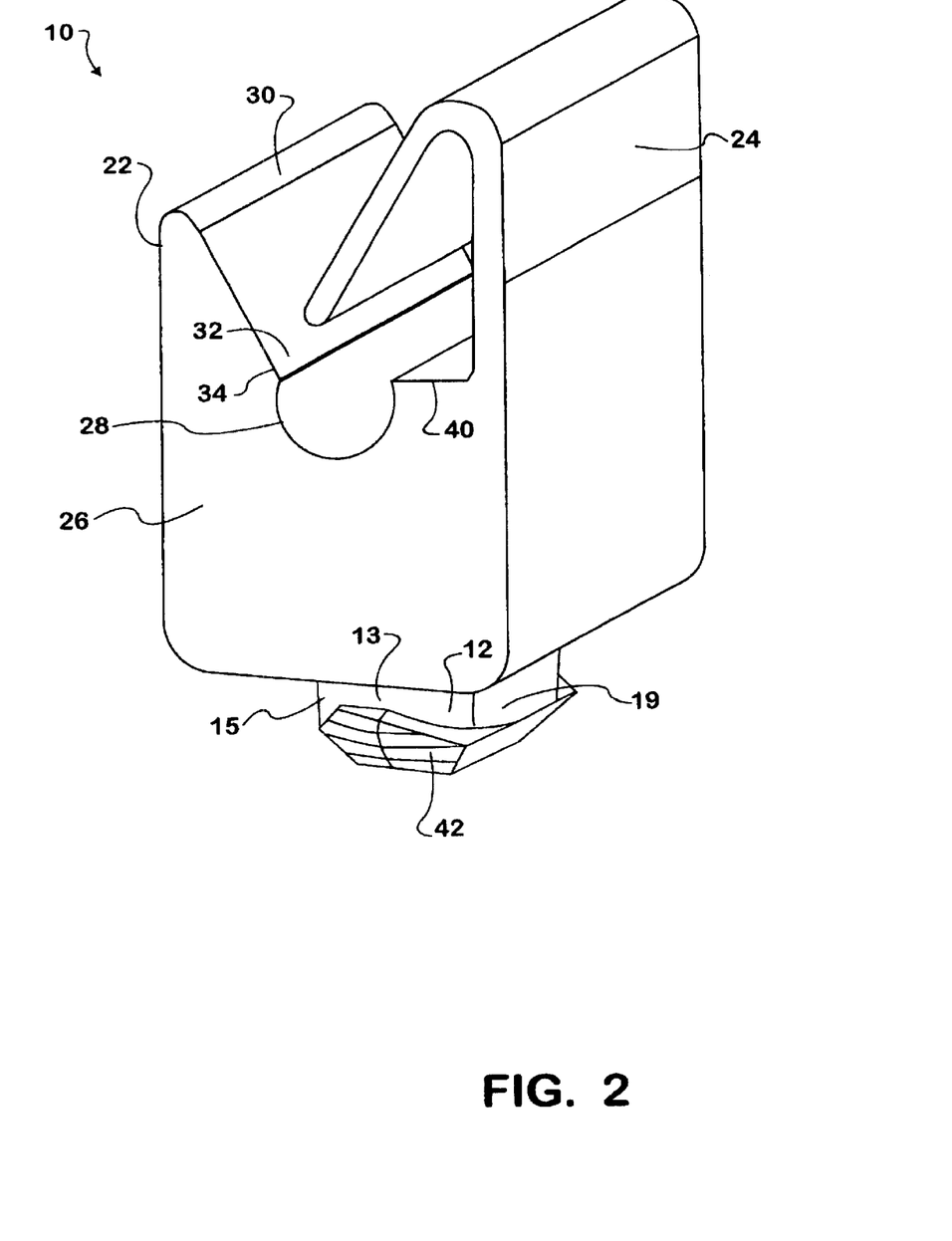
FIG. 2 is a perspective view from the side of one of the tube clips of the invention.

As shown in FIGS. 1 and 2, clip end 20 has a pair of opposite sides 22, 24, base 26 and channel 28 for receiving a tube or tubing. Channel 28 is preferably U-shaped and extends along the length of base 26. To fit tubing 100 firmly into channel 28, the channel depth is preferably greater than one half the external diameter of the tubing.

First side 22 has slanted guide 30 extending inwardly along the length of first side 22 distal to base 26. Slanted guide 30 has channel end 32 connected to first channel top 34. Second side 24 can be longer than first side 22. Second side 24 has slanted outer face 38 extending inwardly along the length of second side 24 distal to base 26. Slanted guide 30 and slanted outer face 38 cooperatively guide tubing into channel 28. Ledge 40 extends from second channel top 36 to second side 24.

In the preferred embodiment shown in FIGS. 5–9, the first and second side are defined by first and second sidewalls 62, 64, respectively. First and second sidewalls 62, 64 are at opposite ends of base 66 and are substantially perpendicular thereto. Sidewalls 62, 64 align to cooperatively guide tubing 100 into channel 28. First sidewall 62 has slanted guide 68 extending inwardly along the length of the first sidewall 62 distal to base 66. Preferably, slanted guide 68 has channel end 70 connected to channel 28.

Slanted outer face 76 of second sidewall 64 is part of inwardly overhanging lip 74, which extends from second sidewall 64 distal to base 66 toward first sidewall 62 and along the length of second sidewall 64. Inner face 78 is opposite outer face 76 of overhanging lip 74. Preferably, overhanging lip 74 compresses when inserting tubing 100 into channel 28. After inserting tubing 100 into channel 28, overhanging lip 74 springs back to let edge 79 rest on or near tubing 100, to keep tubing 100 properly positioned within the tube clip. Bridge 80 preferably spans from second sidewall interior 82 to inner face 78 of overhanging lip 74 and curves away from base 66 and is located at the center of second sidewall 64. Ledge 84 is between second channel top 86 and second sidewall interior 82.

Channel wall 88 parallels sidewalls 62, 64 at the center of base 66 and is perpendicular thereto. Channel 28 is located at the end of channel wall 88 opposite base 66. Center wall 90 is at the center of base 66 and channel wall 88 and is perpendicular thereto. First part 92 of center wall 90 connects base 66, channel wall 88, channel 28 and first sidewall interior 63. Second part 93 of center wall 90 connects base 66, channel wall 88, channel 28, ledge 84 and second sidewall interior 82.

Figure 10:
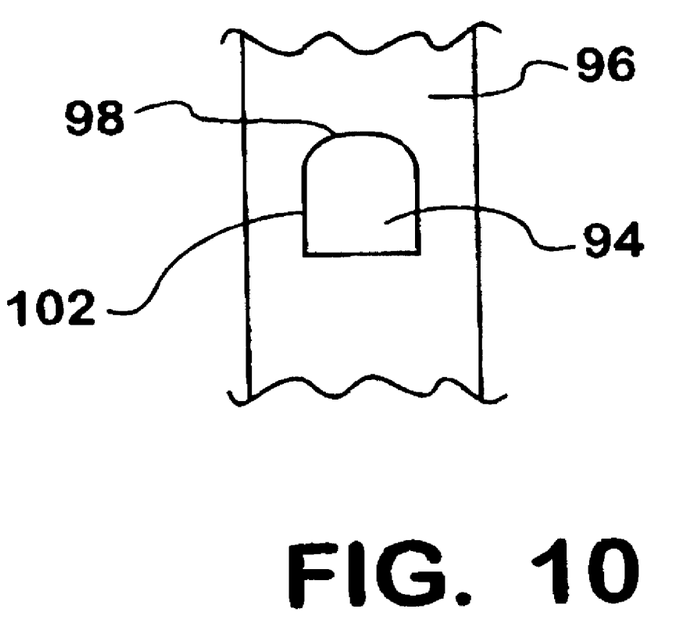
FIG. 10 is a top plan partial view of a bracket for receiving the tube clip of the invention.

When using the tube clip of the invention, the tube clip can only be inserted in one orientation within a mounting support. Cam 13 of tube clip 10, for example, inserts into slot 94 defined by border 102 located within the mounting support, such as bracket 96. Slot 94 is preferably elongated and has a simple design which matches the design of head 42 and is slightly larger than cam 13 (FIG. 10). Curved portion 48 of head 42 aligns with curved part 98 of border 102. Cam 13 inserts within slot 94 and rotates about one quarter turn or about 90° to positively lock the tube clip into bracket 96. The short 15, 17 and long 14, 16 rectangular sections of stem 12 abut against border 102 to prevent the tube clip from turning past about 90°. Shoulders 54, 56 further lock the tube clip into place by compressing against the mounting support.

Because the distance between the base of the tube clip and the shoulders of the cam is about the same or slightly less than the thickness of the bracket, the tube clip fits tightly. Therefore, the tube clip is preferably at least semi-rigid. The tube clip should be flexible enough to allow the clip end to flex when inserting the tubing and spring back after insertion or tubing removal as well as the insertion of the cam into the bracket. The shoulders may also compress against the mounting support after rotating the clip. Yet, the tube clip must be rigid enough to allow insertion and positioning of the cam into the bracket and to hold the position of the tubing after insertion without breaking or movement.

After installing the tube clip to a support, the tubing snaps into place within the clip end. When the tubing is pushed between the slanted guide and the outer face toward the channel, the overhanging lip and bridge flex toward the inner surface of the second sidewall. After inserting the tubing within the channel, the overhanging lip and bridge spring back. If desired, the edge of the overhanging lip can rest on or near the tubing.

The tube clip of the invention has a number of advantages. The design of the cam allows the tube clip to be inserted only one way. This one way design prevents an assembly worker from installing the tube clip in the wrong direction. The curved portion of the head and the matching curved part of the slot in the mounting support allows the assembly worker to quickly place the clip in the correct position. The combination of the stem and shoulders allows the tube clip to turn only in one direction and prevent the tube clip from rotating past the quarter turn. After insertion, the shoulders positively hold the tube clip in place. Because the tube clip must be turned to orient it for proper tube insertion, it cannot be put in "half-way." Moreover, the installed tube clip cannot be rotated back to a position from which it can come out once the tubing is inserted into the channel. The tubing holds the tube clip in position so the tube clip cannot be loosened from the bracket by vibrations.

Protecting the tube from excessive vibration is another advantage of the invention. The tube clip dampens vibrations to reduce stress on the tubing. If the tube clip should somehow be removed or omitted, the offset of the tubing in the tube clip from the mounting support is designed to be sufficiently distant from the mounting support to protect the tubing and prevent the tubing from failing with the bracket. Because tubing in typically used with hydraulic lines, especially motor vehicle brake lines, preventing the tubing from failing will prevent the loss of hydraulic brake fluid and subsequent brake failure.

The tube clip of the invention can be easily varied to fit the size of the tube. The molds for the tube clip are simply designed, having few extra parts. Because they require few parts, the molds of the tube clip can be readily altered to adjust the size of the channel and the sidewalls to fit the cross-sectional external diameter of the tube.

The tubing is easy to install and remove from the tube clip. In the preferred embodiment, the overhanging lip and bridge are flexible. The overhanging lip is a spring that easily compresses toward the second sidewall when the tubing is inserted. After snapping the tubing into the channel, both readily spring back to position. Removing the tubing is equally easy. The worker simply compresses the overhanging lip toward the second sidewall interior and pops out the tubing.

While the clip end acts as a spring, the cam is relatively rigid. Because the cam cannot easily compress while inserting within the bracket slot, it cannot be easily forced into the slot in the wrong direction. Because the semi-rigid cam has few parts, it is less likely to break or tear if over-torqued during insertion. This allows the easy removal of the tube clip if desired.

The clip end maintains the position of the tubing. If the tubing comes loose from the channel, the position of the overhanging lip can keep the tubing from jarring loose from the tube clip.

While the invention is shown in only one of its forms, it is not thus limited but is susceptible to various changes and modifications without departing from the spirit and scope of the invention.

What is claimed is:

1. A tube clip comprising:
   a clip end comprising a base, first and second sides at opposite ends of the base and perpendicular thereto, and a channel being located between the first and second sides, the first side having a slanted guide extending inwardly along a length of the first side distal to the base, the second side having a slanted outer face extending inwardly along a length of the second side distal to the base, the slanted guide and the slanted outer face being aligned to cooperatively guide a tube into the channel;
   a cam comprising a head, and a stem connecting the head to the base, the head having a beveled edge and a shoulder projecting from the beveled edge toward the stem and overhanging the base; and
   wherein the second side is longer than the first side.

2. A tube clip of claim 1, wherein the stem has opposite curved sides.

3. A tube clip comprising:
   a clip end comprising a base, first and second sides at opposite ends of the base and perpendicular thereto, and a channel being located between the first and second sides, the first side having a slanted guide extending inwardly along a length of the first side distal to the base, the second side having a slanted outer face extending inwardly along a length of the second side distal to the base, the slanted guide and the slanted outer face being aligned to cooperatively guide a tube into the channel; and
   a cam comprising a head, and a stem connecting the head to the base, the head having a beveled edge and a shoulder projecting from the beveled edge toward the stem and overhanging the base, wherein the stem has opposite curved sides, and wherein the stem has rectangular sections with a single pair of opposed rounded vertices.

4. A tube clip comprising:
   a clip end comprising a base, first and second sides at opposite ends of the base and perpendicular thereto, and a channel being located between the first and second sides, the first side having a slanted guide extending inwardly along a length of the first side distal to the base, the second side having a slanted outer face extending inwardly along a length of the second side distal to the base, the slanted guide and the slanted outer face being aligned to cooperatively guide a tube into the channel;
   a cam comprising a head, and a stem connecting the head to the base, the head having a beveled edge and a shoulder projecting from the beveled edge toward the stem and overhanging the base; and
   wherein the shoulder is curved and the stem has opposite curved sides.

5. A tube clip comprising:
   a clip end comprising a base, first and second sidewalls at opposite ends of the base and perpendicular thereto, and a channel being located between the first and second sidewalls, the sidewalls being aligned to cooperatively guide a tube into the channel;
   a stem connecting a head with the base; and
   the head having a quadrilateral flat surface with two pairs of parallel head portions, beveled edges bordering each head portion, and shoulders projecting from the parallel beveled edges toward the stem and overhanging the base.

6. A tube clip of claim 5, further comprising:
   a slanted guide having a channel end connected to the channel and extending inwardly from the channel to the first sidewall along the length of the first sidewall distal to the base.

7. A tube clip of claim 6, further comprising:
   (a) an inwardly overhanging lip extending along the length of the second sidewall distal to the base, the overhanging lip having opposite inner and outer faces.

8. A tube clip of claim 7, wherein the overhanging lip is a spring.

9. A tube clip of claim 8, wherein the channel is U-shaped.

10. A tube clip of claim 8, wherein the stem has opposite curved sides.

11. A tube clip comprising:
    a clip end comprising a base, first and second sidewalls at opposite ends of the base and perpendicular thereto, a slanted guide extending inwardly along the length of the first sidewall distal to the base, an inwardly overhanging lip extending along the length of the second sidewall distal to the base, the overhanging lip having opposite inner and outer faces, and a channel being located between the first and second sidewalls, the sidewalls being aligned to cooperatively guide a tube into the channel, and wherein the overhanging lip is a spring;
    a stem connecting a head with the base;
    the head having a quadrilateral flat surface with two pairs of parallel head portions, beveled edges bordering each head portion, and shoulders projecting from the parallel beveled edges toward the stem and overhanging the base; and
    wherein the stem has rectangular sections with a single pair of opposed rounded vertices.

12. A tube clip of claim 11, wherein the shoulders are curved.

13. A tube clip of claim 12, wherein one head portion is curved.

14. A tube clip comprising:
    a clip end comprising a base, first and second sidewalls at opposite ends of the base and perpendicular thereto, a slanted guide extending inwardly along the length of the first sidewall distal to the base, an inwardly overhanging lip extending along the length of the second sidewall distal to the base, the overhanging lip having opposite inner and outer faces, and a channel being located between the first and second sidewalls, the slanted guide and the overhanging lip being aligned to cooperatively guide a tube into the channel; and a cam for inserting into a slot within a mounting support and rotating after insertion for locking the tube clip to the mounting support.

15. A tube clip of claim 14, wherein the cam rotates about 90° after insertion.

16. A tube clip of claim 15, wherein the cam prevents a rotation of greater than about 90° after insertion.

17. A tube clip of claim 16, wherein the overhanging lip is a spring.

18. A tube clip of claim 17, wherein the cam further comprises:

(a) a stem having opposite curved sides; and (b) a head with beveled edges, and shoulders projecting from the beveled edges toward the stem and overhanging the base.

19. A tube clip comprising:

a clip end comprising a base, first and second sidewalls at opposite ends of the base and perpendicular thereto, a slanted guide extending inwardly along the length of the first sidewall distal to the base, an inwardly overhanging lip extending along the length of the second sidewall distal to the base, the overhanging lip having opposite inner and outer faces, and a channel being located between the first and second sidewalls, the sidewalls being aligned to cooperatively guide a tube into the channel, wherein the overhanging lip is a spring;

a cam for inserting into a slot within a mounting support and rotating after insertion for locking the tube clip to the mounting support, the cam having a head with beveled edges and a stem connecting the head to the base and having opposite curved sides, the head having shoulders projecting from the beveled edges toward the stem and overhanging the base, and wherein the opposite curved sides are rectangular sections with a single pair of opposed rounded vertices; and wherein the cam rotates about 90° and prevents the rotation past about 90° after insertion.

20. A tube clip of claim 19, wherein the shoulders are curved.

21. A tube clip of claim 20, wherein the head further comprises:

(a) a curved head portion.

* * * * *